US011709071B2

(12) United States Patent
Rao et al.

(10) Patent No.: US 11,709,071 B2
(45) Date of Patent: Jul. 25, 2023

(54) GEOGRAPHIC MAP ANNOTATION

(71) Applicant: Uber Technologies, Inc., San Francisco, CA (US)

(72) Inventors: Shailendra Ramineni Rao, Palo Alto, CA (US); Robin Carol Tolochko, San Francisco, CA (US); Kamal Sharif Lukman, Amstelveen (NL); Eleanor Cady Wachsman, San Francisco, CA (US); Adam Jeremy Share, San Francisco, CA (US); Jingyu Yan, Palo Alto, CA (US); Joshua Michael Bisch, San Francisco, CA (US)

(73) Assignee: Uber Technologies, Inc., San Francisco, CA (US)

(*) Notice: Subject to any disclaimer, the term of this patent is extended or adjusted under 35 U.S.C. 154(b) by 888 days.

(21) Appl. No.: 16/203,096

(22) Filed: Nov. 28, 2018

(65) Prior Publication Data

US 2019/0162550 A1 May 30, 2019

Related U.S. Application Data

(60) Provisional application No. 62/591,665, filed on Nov. 28, 2017.

(51) Int. Cl.
*G01C 21/36* (2006.01)
*G06F 16/44* (2019.01)
*G06F 16/29* (2019.01)
*G06Q 10/02* (2012.01)
*G06F 40/169* (2020.01)

(52) U.S. Cl.
CPC ....... *G01C 21/367* (2013.01); *G01C 21/3676* (2013.01); *G06F 16/29* (2019.01); *G06F 16/444* (2019.01); *G06F 40/169* (2020.01); *G06Q 10/02* (2013.01)

(58) Field of Classification Search
CPC ...... G06F 16/29; G06F 16/335; G06F 40/169; G01C 21/3811
See application file for complete search history.

(56) References Cited

U.S. PATENT DOCUMENTS

2004/0243307 A1* 12/2004 Geelen .................... G01S 19/24
701/469
2010/0082246 A1* 4/2010 Crane ................ G01C 21/3476
701/533

(Continued)

*Primary Examiner* — Peter D Nolan
*Assistant Examiner* — Ce Li Ll
(74) *Attorney, Agent, or Firm* — Schwegman Lundberg & Woessner, P.A.

(57) ABSTRACT

Various embodiments provide for annotating a geographic map. Display of a geographic map on a client device can be adjusted (e.g., pan over geographic map or adjust zoom level), and a first set of map annotations for the adjusted map is determined, where the first set of map annotations comprises at least one map annotation associated with a transport service opportunity. From the first set of map annotations, a second set of map annotations can be determined based on a map annotation visual hierarchy. For instance, at least a portion of the second set of map annotations can be determined by filtering the first set of map annotations based on a type of transport service opportunity. Subsequently, the second set of map annotations can be presented on the adjusted map on the display.

19 Claims, 7 Drawing Sheets

(56) References Cited

U.S. PATENT DOCUMENTS

| | | | |
|---|---|---|---|
| 2011/0010650 A1* | 1/2011 | Hess | G06F 3/04817 |
| | | | 715/765 |
| 2013/0246207 A1* | 9/2013 | Novak | G06Q 30/0641 |
| | | | 705/26.2 |
| 2017/0293925 A1* | 10/2017 | Marueli | G06Q 30/0206 |
| 2017/0310770 A1* | 10/2017 | Samaan | H04L 45/306 |
| 2018/0225796 A1* | 8/2018 | Liu | G06Q 50/30 |
| 2018/0314998 A1* | 11/2018 | Liu | G06Q 10/04 |
| 2018/0349413 A1* | 12/2018 | Shelby | G01C 21/3415 |

* cited by examiner

GEOGRAPHIC MAP ANNOTATION

PRIORITY

This claims the benefit of priority to U.S. Provisional Patent Application Ser. No. 62/591,665, entitled "MAP MARKER FRAMEWORK," filed on Nov. 28, 2017, which is hereby incorporated by reference herein in its entirety.

TECHNICAL FIELD

The described embodiments generally relate to geographic maps and, more particularly, to systems, methods, and machines for annotating geographical maps.

BACKGROUND

Systems and methods exist that can arrange for a transport service to be provided by a driver through the use of computing devices. For instance, a user can make a request for a transport service (e.g., ride, ride-share, or delivery service) using a mobile computing device, and a system can select a driver to perform the transport service for the user. Generally, after the user makes the request for the transport service, the transport service can be listed as a transport service opportunity (e.g., one of several such opportunities) that one or more drivers can review for acceptance using their respective computing devices mobile computing devices). When reviewing such opportunities through their computing device, a driver may be presented with a geographic map that includes one or more annotations (e.g., markers, icons, pins, polygons, dots, labels, reference lines, etc.) that mark or designate corresponding opportunities on the geographic map. At times, the map annotations displayed on the geographic map can clutter the geographic map or render the geographic map hard for a driver to read or interact with (e.g., through a touch display of a mobile device). This can result in a confusing experience for the driver or make it difficult for the driver to review transport service opportunities.

BRIEF DESCRIPTION OF THE DRAWINGS

Various ones of the appended drawings merely illustrate various embodiments of the present disclosure and cannot be considered as limiting its scope.

Figure 1:
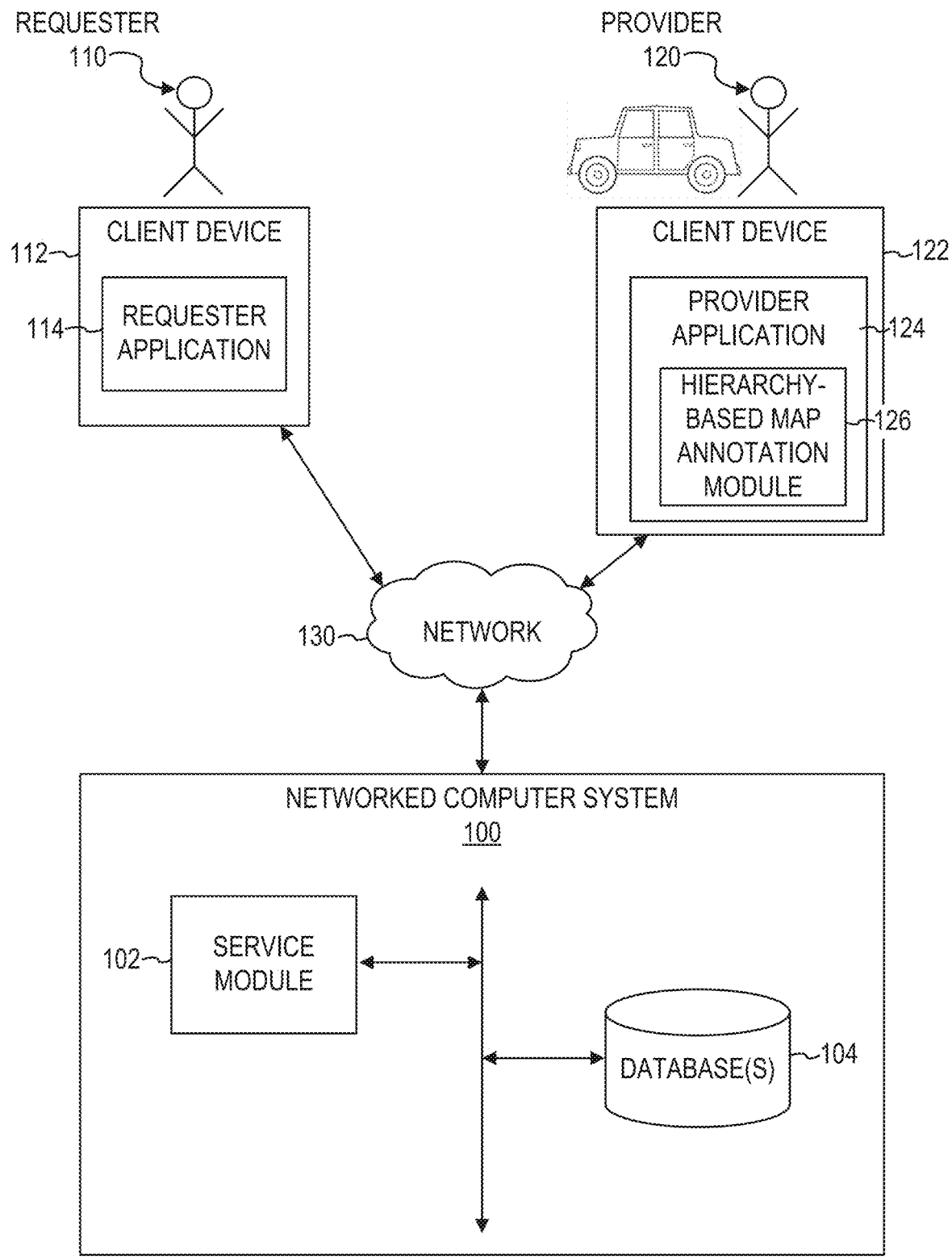
FIG. 1 is a block diagram of a system environment for a networked computer system, in accordance with some embodiments.

The headings provided herein are merely for convenience and do not necessarily affect the scope or meaning of the terms used.

DETAILED DESCRIPTION

The description that follows describes systems, methods, techniques, instruction sequences, and computing machine program products for annotating a geographical map and, more particularly, annotating a geographical map (hereafter, "map") in connection with a transport service. The description includes illustrative systems, methods, techniques, instruction sequences, and computing machine program products that embody illustrative embodiments. In the description, for purposes of explanation, numerous specific details are set forth in order to provide an understanding of various embodiments of the inventive subject matter. It will be evident, however, to those skilled in the art that embodiments of the inventive subject matter can be practiced without these specific details. In general, well-known instruction instances, protocols, structures, and techniques have not been shown in detail.

Various embodiments implement a map annotation technique (e.g., a map annotation framework) that annotates (or causes annotation of) a geographic map, displayed to a user (e.g., transport service provider), with one or more map annotations based on a map annotation visual hierarchy (e.g., a map annotation display logic). Based on a map annotation visual hierarchy, an embodiment described herein can determine which map annotations should be displayed on a geographic map presented to a user, can determine when map annotations are displayed on the geographic map, and can determine how map annotations are displayed on the geographic map. Additionally, an embodiment can apply the map annotation visual hierarchy when there are multiple types of map annotation that can be displayed on the geographic map at the same time. For some embodiments, the map annotation visual hierarchy of the one or more map annotations is based on relevance or importance of the one or more map annotations to the user (e.g., relevance or importance of the information represented by the one or more annotations) observing the geographic map. In particular, the map annotation visual hierarchy can cause map annotations that are conceptually most important at a given moment to appear more prominently on the map than other (e.g., less important) map annotations.

For a geographic map currently being displayed to a user, some embodiments can determine a first set of map annotations that can be displayed on the geographic map. This determination can be triggered in response to the user requesting or causing a view of the geographic map being adjusted (e.g., panned, zoomed in, zoomed out, rotated, perspective change, etc.). Additionally, the determination can be triggered in response to the user searching for a place, a geographical location, or a category of interest to the user (e.g., typing a query in a search field). Determining the first set of map annotations can comprise retrieving (e.g., by a client device from a server) data related to one or more transport service opportunities applicable to at least a portion of the geographic map visible on an electronic display (hereafter, display). From the determined set of map annotations, some embodiments can determine a second set of map annotations based on a map annotation visual hierarchy.

For instance, determining the second set of map annotations (from the first set of map annotations) based on the map annotation visual hierarchy can comprise filtering the first set of map annotations based on a type of transport service opportunity to determine at least a portion of the second set of map annotations. For example, the first set of map annotations can be filtered so that the second set of map annotations includes map annotations relating to ride transport service opportunities, courier transport service opportunities, food transport service opportunities, and enhanced payout transport service opportunities (e.g., boost transport service opportunities) but does not include points-of-interests (POIs) and general map labels. Additionally, map annotations that are determined to collide if displayed on the geographic map can be filtered such that: collided map annotations associated with transport service opportunities preferred by a user are retained over collided map annotations associated with other transport service opportunities; collided map annotations associated with enhanced payout transport service opportunities are retained over collided map annotations associated with other transport service opportunities having lower or no enhanced payout; collided map annotations associated with transport service opportunities having high volume (e.g., current or projected high volume) are retained over collided map annotations associated with other transport service opportunities; collided map annotations associated with airport-related transport service opportunities are retained over collided map annotations associated with other transport service opportunities; and collided map annotations associated with event-related transport service opportunities are retained over collided map annotations associated with other transport service opportunities.

In another instance, determining the second set of map annotations (from the first set of map annotation) based on the map annotation visual hierarchy can comprise determining that two or more map annotations, in the first set of map annotations, would at least partially overlap (e.g., collide) if displayed on the adjusted map, and clustering together the two or more map annotations into a single map annotation in the second set of map annotations. Alternatively, determining the second set of map annotations (from the first set of map annotations) based on the map annotation visual hierarchy can comprise determining that two or more map annotations, in the first set of map annotations, would be too close to each other (e.g., within a certain pixel proximity) if displayed on the adjusted map, and clustering together the two or more map annotations into a single map annotation in the second set of map annotations. The single map annotation can be selectable by a user (e.g., using a client device), where user selection of the single map annotation can cause adjustment of the geographical map to generate an adjusted map (e.g., zoom into the geographic map, such as to a region level or a neighborhood level); and cause presentation of the two or more map annotations on the adjusted map (e.g., cause the single map annotation to "split" into the two or more map annotations, thereby revealing the individual map annotations of the cluster). Clustering the two or more map annotations into the single map annotation can comprise selecting the single map annotation, from the two or more map annotations, based on a set of map annotation prioritization rules. Example map annotation prioritization rules can include, without limitation: a rule where a map annotation associated with a transport service opportunity having an enhanced payout (e.g., boost payout) has higher priority for being selected than another map annotation; a rule where a map annotation associated with a first transport service opportunity having an enhanced payout has higher priority for being selected than a map annotation associated with a second transport service opportunity relating to an airport; a rule where a map annotation associated with a first transport service opportunity having an enhanced payout has higher priority for being selected than a map annotation associated with a second transport service opportunity relating to an event (e.g., a concert, a football game, a conference/convention, etc.); and a rule where a map annotation associated with a first transport service opportunity relating to an airport has higher priority for being selected than a map annotation associated with a second transport service opportunity relating to an event. Additionally, a rule can comprise where a first map annotation has a higher priority for being selected (as the single map annotation) over a second map annotation in response to the first map annotation being associated with a transport service opportunity having greater transport service (e.g., ride service, courier service, etc.) volume or having higher transport service importance. For some embodiments, where a plurality of map annotations associated with enhanced-payout transport service opportunities is clustered together (possibly with other map annotations) into a single map annotation, the single map annotation selected comprises a map annotation that represents a range of multipliers (e.g., 1.2 through 2.2) that includes all the multipliers associated with the enhanced-payout transport service opportunities represented by the single map annotation.

In another instance, determining the second set of map annotations (from the first set of map annotation) based on the map annotation visual hierarchy can comprise: determining that two or more map annotations, in the first set of map annotations, would at least partially overlap if displayed on the adjusted map; and selecting, from the two or more map annotations, one or more particular map annotations to be included in the second set of map annotations based on respective map annotation types.

In yet another instance, determining the second set of map annotations (from the first set of map annotation) based on the map annotation visual hierarchy can comprise filtering the first set of map annotations based on information relating to a transport service provider (e.g., drivers' preference, vehicle characteristic, availability, etc.). Examples of user preferences for a transport service provider can include, without limitation, a preferred origin area, a preferred destination area, a preferred airport, a preferred event, a preferred type of event, a preferred passenger limit, and a preference to provide transport services having enhanced payout (e.g., higher prices where conditions indicate higher than usual demand for transport services).

As used herein, a geographic map, being viewed through a display coupled to a computing device (e.g., client device), can comprise a plurality of map portions such that adjusting a view of the geographic map can cause different portions of the geographic map to come into view through the electronic display. Example adjustment of a geographic map can include, without limitation, panning over the geographic map, adjusting a zoom level of the geographic map, or changing perspective of the geographic map (e.g., 2D to 3D).

As used herein, a map annotation can comprise a visual element that can be displayed over a geographic map (e.g., a base geographic map), and the visual element may or may not scale with the geographic map as the resolution or zoom level of the geographic map is adjusted (e.g., zoom level is increased or decreased). Examples of a map annotation can include, without limitation, a marker, an icon (e.g., representing a place, such as an airport), a pin (e.g., a pick-up or drop-off pin with respect to a transport service), and a dot (e.g., a dot representing a current geographic position system (GPS) coordinate).

As used herein, a "collision" between two or more map annotations on a geographic map can comprise the two or more map annotations at least partially overlapping (e.g., overlap of pixel). According to some embodiments, when two or more map annotations on a geographic map collide, a collision logic is applied to decide which map annotation is displayed on the geographic map. Those map annotations that are not displayed due to the collision logic are considered "collided out." For instance, if a road label would intersect with a point-of-interest (POI) label if both were displayed on a geographic map, an embodiment can cause one to be displayed on the geographic map (e.g., road label or POI label) while the other is not displayed on the geographic map.

As used herein, payout for a transport service can comprise a price paid by a transport service requester for a transport service provided by a transport service provider. An enhanced payout for a transport service can comprise a price (paid by a transport service requester to a transport service provider) that is higher than otherwise for a certain time period or a certain geographic area. For instance, a transport service can have an enhanced payout when the transport service is associated with a time period or a geographic area that is observing a higher level of demand for the transport service than usual for the time period or geographic area. A transport service opportunity having an enhanced payout can be referred to as a boost opportunity, and the enhanced payout can comprise a multiplier (e.g., 1.2-2.3×) that is applied to a standard payout.

Use of some embodiments can improve a computing device ability to generate a geographic map comprising map annotations. The resulting geographic map can be less cluttered and easier to read by a user (e.g., a transport service provider, such as a driver) than geographic maps generated by previous methodologies. Some embodiments enable or improve a computing device's ability to handle map annotation collisions (e.g., between map markers and layers of the base geographic map). Additionally, some embodiments enable or improve a computing device's ability to prioritize map annotations (e.g., map markers) displayed on a geographic map (e.g., prioritize based on user preferences).

By way of an embodiment, one or more annotations resulting on a geographic map can enable a user to easily review information conveyed by the one or more annotations, which in turn can permit the user to make better decisions (e.g., select transport service opportunities most important or appealing to them). For instance, for a user that is serving as a transport service provider (e.g., driver) that provides ride/ride-share transport services, an embodiment can cause a geographic map to be annotated such that the geographic map presents the user the best geographic locations or places for the user to obtain ride/ride-share service opportunities. In another instance, for a user that is serving as a transport service provider that provides one or more different transport services (e.g., tide, courier, or delivery transport service), an embodiment can cause a geographic map to be annotated such that the geographic map presents the user the best geographic locations or places for the user to obtain transport service opportunities having the highest driver payouts. In another instance, for a user that is serving as a transport service provider (e.g., courier) that provides courier transport services, an embodiment can cause a geographic map to be annotated such that the geographic map shows the user the best geographic locations or places for the user to obtain transport service opportunities that match the user's preference or match the user's vehicle characteristic.

Through an embodiment, a transport service provider (e.g., serving as a driver or courier) can review one or more map annotations on a geographic map that present different types of transport service opportunities available to the transport service provider based on one or more of their preferences or their vehicle characteristic (e.g., vehicle type). For instance, a courier can use an embodiment to review map annotations relating to courier transport services (e.g., package or food delivery) and avoid having to review map annotations relating to ride transport services. In another instance, a transport service provider can use an embodiment to easily compare different transport service opportunities at the same time even when it is not possible to display all available transport service opportunities as map annotations due to map annotation collisions. As described herein, clustering of two or more map annotations can address map annotation collisions on a geographic map using a set of map annotation prioritization rules.

Various embodiments disclosed herein may be implemented as a computing device having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram of a system environment for networked computer system 100, in accordance with some embodiments. In some embodiments, the networked computer system 100 coordinates (or facilitates the coordination of) a transport service for a service requester 110 (e.g., such as a rider) by a service provider 120 (e.g., a driver of a vehicle), which can comprise transportation of persons and/or goods/items for the service requester 110 by the service provider 120. The service provider 120 can use a vehicle to provide the transport service for the service requester 110. Depending on the embodiment, the client device 122 of the service provider 120 retrieves from the networked computer system 100 map data and transport service opportunity data in connection with coordinating transport services between service requesters and service providers. In particular, based on the map data and transport service opportunity data retrieved from the networked computer system 100, the service provider 120 can use their client device 122 to review and/or accept one or more opportunities to provide transport services (e.g., transport a person, good, or item) for one or more service requesters, such as the service requester 110.

In some example embodiments, the networked computer system 100 comprises any combination of one or more of a service module 102, and one or more databases 104. These modules and databases are not native components of a generic computer system, and provide structures and functions beyond generic functions of a computer system, as further described below.

In some example embodiments, the modules 102 and the database(s) 104 reside on a machine having a memory and at least one processor (not shown). In some example embodiments, the modules 102 and the database(s) 104 reside on the same machine, while in other example embodiments, one or more of modules 102 and database(s) 104 reside on separate remote machines that communicate with each other via a network (e.g., network 130). It is contemplated that other configurations are also within the scope of the present disclosure.

In some example embodiments, the requester 110 operates a client device 112 that executes a requester application 114 that communicates with the networked computer system 100. The requester operates the requester application 114 to view information about the networked computer system 100, and to make a request for service from the networked computer system 100 for a transport service ("a trip") of the requester 110 (ride for the requester 110 and, optionally, additional persons) and/or items, for example cargo needing transport. The requester application 114 determines a pick-up location within an origin location or enables the requester 110 to specify a pick-up location and/or a destination location associated with the trip. An origin location and/or a destination location may be a location inputted by the requester 110 or may correspond to the current location of the requester client device 112 as determined automatically by a location determination module (not shown) in the requester client device 112, e.g., a global positioning system (GPS) component, a wireless networking system, or a combination thereof. For purposes of simplicity, as described herein, an origin location can include a pick-up location for service (i) determined by the requester application 114 (e.g., based on the current location of the requester client device 112 using a GPS component), (ii) specified or selected by the requester 110, or (iii) determined by the networked computer system 100. In some embodiments, the networked computer system 100 recommends a pick-up location to a requester 110 based on historical trip data associated with the origin location.

According to examples herein, the requester client device 112 can transmit a set of data to the networked computer system 100 over a network 130 in response to requester input or operation of the requester application 114. Such data can be indicative of the requester's interest in potentially requesting service (e.g., before actually confirming or requesting the service). For example, the requester 110 may launch the requester application 114 and specify an origin location and/or a destination location to view information about the networked computer system 100 before making a decision on whether to request service. The requester 110 may want to view information about the average or estimated time of arrival for pick up by a provider 120, the estimated time to the destination, the price, the available service types, etc. Depending on implementation, the data can include the origin and/or destination location information, requester information (e.g., identifier), application information (e.g., version number), device identifier or type, etc. According to some examples, each time the requester 110 modifies the origin and/or destination location, the requester application 114 can generate and transmit the data to the networked computer system 100.

The network 130 may be any network that enables communication between or among machines, databases, and devices (e.g., the networked computer system 100 and the client devices 112 and 122). Accordingly, the network 130 may be a wired network, a wireless network (e.g., a mobile or cellular network), or any suitable combination thereof. The network 130 may include one or more portions that constitute a private network, a public network (e.g., the Internet), or any suitable combination thereof. Accordingly, the network 130 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 130 may communicate information via a transmission medium. As used herein, "transmission medium" shall be taken to include any intangible medium that is capable of storing, encoding, or carrying instructions for execution by a machine, and includes digital or analog communication signals or other intangible media to facilitate communication of such software.

Once the requester 110 confirms or orders a transport service via the requester application 114, the requester application 114 can generate data corresponding to a request for the transport service through the networked computer system 100 (e.g., a "trip request"). Responsive to receiving a transport service request, the networked computer system 100 determines the average estimated time of arrival (ETA) at the pick-up location of providers 120 whose current location is within a threshold distance of the pick-up location (e.g., providers 120 who are all within one mile of the pickup location). In some embodiments, responsive to determining that requester's ETA is within a threshold amount of time of the average ETA of nearby available providers 120, the networked computer system 100 uses information from the transport service request to match the requester 110 with an available provider 120. Depending on implementation, the transport service request can include requester or device information (e.g., a requester identifier, a device identifier), a service type (e.g., vehicle type) and/or selected service option (such as described herein), an origin location, a destination location, a payment profile identifier, a desired departure time, and/or other data. The networked computer system 100 can select the provider 120 from a set of providers, such as based on the provider's current location and status (e.g., offline, online, available, etc.) and/or information from the trip request (e.g., service type, origin location, and/or destination location), to provide the service for the requester and transport the requester 110 from the origin location to the destination location.

After selecting one or more available providers (e.g., the provider 120 if available and in geographic proximity to the requester 110), the networked computer system 100 can provide (e.g., post) the requested transport service as a transport service opportunity that is available, reviewable, and acceptable by at least one of the available providers. For some embodiments, the transport service opportunity is displayed as a map annotation on a geographic map (e.g., marker, icon, pin, dot, etc.) that the provider 120 can view through the client device 122. This geographic map can assist in reviewing and selecting from available transport service opportunities based on geographic locations or regions associated with those available transport service opportunities.

In one example embodiment, the networked computer system 100 periodically determines the requester's ETA at the pick-up location based on the topological and geospatial location of the requester client device 112. In some example embodiments, the networked computer system 100 selects the provider 120 based on a comparison of the requester's ETA and the provider's ETA at the pick-up location. For example, if the networked computer system 100 determines that the requester 110 is about three minutes away from the pick-up location, the networked computer system 100 might select a provider 120 who is also about three minutes away even if other providers 120 have a shorter ETA. If, after matching the requester 110 with an available provider 120, the networked computer system 100 determines that the requester's ETA and the provider's ETA at the pick-up location vary by over a threshold amount of time, the networked computer system 100 can select another available provider 120 and attempt to reassign the transport service to the selected other available provider 120. For instance, the networked computer system 100 can present the requested transport service to the selected other available provider 120 as a new transport service opportunity (e.g., on a geographic map or through invitation), which the selected other available provider 120 can review and choose to accept.

The provider 120 operates a client device 122 executing a provider application 124 that communicates with the networked computer system 100 to provide information indicating whether the provider 120 is available or unavailable to provide transportation services to requesters 110. For some embodiments, the provider application 124 enables the provider 120 to provide information regarding availability of the provider 120 by logging into the networked computer system 100 and activating a setting indicating that they are currently available to provide service. The provider application 124 also provides the current location of the provider 120 or the provider client device 122 to the networked computer system 100. Depending on implementation, the current location may be a location inputted by the provider 120 or may correspond to the current location of the provider client device 122 as determined automatically by a location determination module (not shown) in the provider client device 122, e.g., a GPS component, a wireless networking system, or a combination thereof.

The provider application 124 can also present information from the networked computer system 100 to the provider 120, such as data regarding available opportunities to provide transport service, navigation instructions, geographic maps, etc. For some embodiments, the provider application 124 presents the provider 120 with a geographic map that includes one or more map annotations that correspond to one or more transport service opportunities available for the provider 120 to review and/or accept. The provider application 124 can allow a provider 120 to accept a transport service opportunity via the geographic map (e.g., via a user input with respect to a map annotation corresponding to the transport service opportunity), and the provider application 124 can transmit an acceptance message to the networked computer system 100. The networked computer system 100 can subsequently provide information about the provider 120 to the requester application 114. In some embodiments, the provider application 124 can enable the provider 120 to view a list of transport service opportunities and to select a particular transport service opportunity to fulfill. The provider application 124 can also receive routing information from the networked computer system 100.

The provider application 124 comprises a hierarchy-based map annotation module 126, which is configured to enable or facilitate annotation of a geographic map, presented through the provider application 124, in accordance with various embodiments described herein. For some embodiments, the hierarchy-based map annotation module 126 implements a map annotation (or map marker) technique (e.g., framework) that annotates (or causes annotation of) geographic maps that the provider application 124 displays to a user based on relevance or importance of the map annotations to the user (e.g., transport service provider).

In some example embodiments, the requester client device 112 and provider client device 122 are portable or mobile electronic devices such as smartphones, tablet devices, wearable computing devices (e.g., smartwatches) or similar devices. Alternatively, the provider client device 122 can correspond to an on-board computing system of a vehicle. Client devices typically have one or more processors, memory, touch screen displays, wireless networking system (e.g., IEEE 802.11), cellular telephony support (e.g., LTE/GSM/UMTS/CDMA/HSDP A, etc.), and location determination capabilities. The requester client device 112 and the provider client device 122 interact with the networked computer system 100 through client applications configured to interact with the networked computer system 100. The applications 114 and 124 of the requester client device 112 and the provider client device 122, respectively, can present information received from the networked computer system 100 on a requester interface, such as a map of the geographic region, and the current location of the requester client device 112 or the provider client device 122. The applications 114 and 124 running on the requester client device 112 and the provider client device 124 can determine the current location of the device and provide the current location to the networked computer system 100.

The networked computer system 100 is configured to provide a communicative interface between the requester application 114, the provider application 124, and the various modules and databases in the networked computer system 100. The networked computer system 100 is configured to receive provider availability status information and current location information from the provider application 124 and update database(s) 104 with the availability status. The networked computer system 100 is also configured to receive transport service requests (e.g., trip request) from the requester application 114 and creates corresponding transport service records (e.g., trip records) in the database(s) 104. According to an example embodiment, a transport service record corresponding to a transport service request can include or be associated with a transport service 1D (e.g., trip ID), a requester ID, an origin location, a destination location, a transport service type, pricing information, and/or a status indicating that the corresponding transport service request has not been processed. According to one example embodiment, when the provider 120 accepts an opportunity (e.g., via a geographic map presenting one or more opportunities) to service a service transport request for the requester 110, the transport service record can be updated with the provider's information as well as the provider's location and the time when the transport service request was accepted. Similarly, location and time information about the transport service as well as the cost for the transport service can be associated with the transport service record.

In some embodiments, the service module 102 is configured to facilitate coordination of transport services between a service provider (e.g., 120) and a service requester (e.g., 110) as described herein. For instance, the service module 102 can receive a request for the transport service from the client device 112 of the requester 110. The service module 102 can identify one or more geographical locations based on the request (e.g., based on one or more place record stored in the database(s) 106), and then transmit identified geographical locations to the client device 122 of the provider 120 of the transport service. In some embodiments, the request comprises an indication of a geographic location or place as a desired origin (e.g., pick-up point) and an indication of a geographic location or a place as a desired destination (e.g., drop-off point). Based on these indications, the service module 102 can identify the final geographic location/place for pick-up and drop-off with respect with the requested transport service. As noted herein, the transport service can comprise transportation of the requester 110 (or a good item of the requester 110) to the destination.

In some embodiments, the service module 102 provides the client device 122 of the provider 120 with map data and transport service opportunity data. As described herein, the service module 102 can cause or enable the networked computer system 100 to select one or more available providers (e.g., the provider 120 if available and in geographic proximity to the requester 110) with respect to a received transport service request (e.g., from the requester 110). The service module 102 can cause or enable the networked computer system 100 to provide (e.g., post) the requested transport service as a transport service opportunity that is available, reviewable, and acceptable by at least one of the available providers. As also described herein, the hierarchy-based map annotation module 126 can cause or enable the provider application 124 to display one or more transport service opportunities as one or more map annotations on a geographic map displayed on the client device 122.

Figure 2:
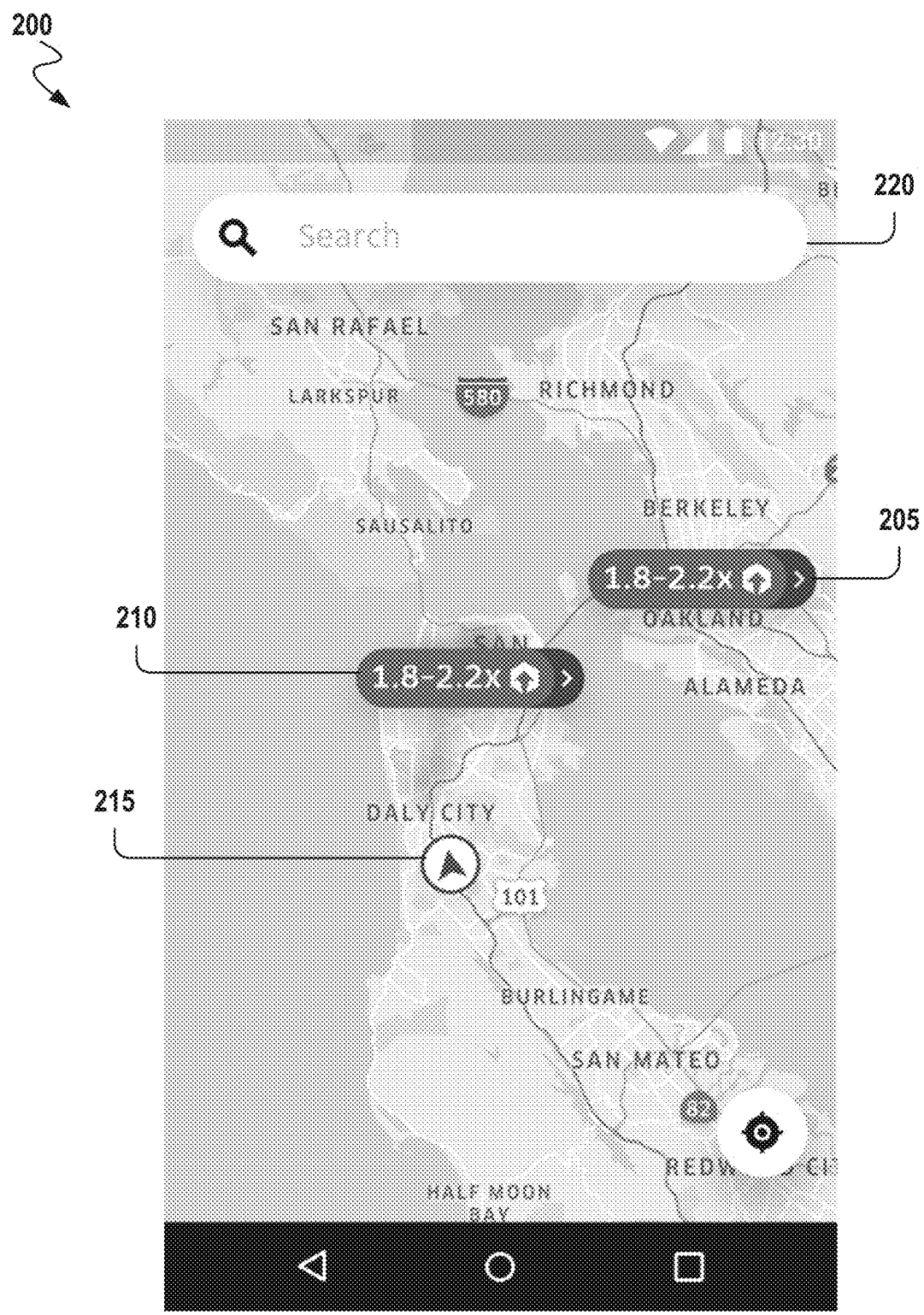
FIGS. 2 through 5 present example maps illustrating example clustering of map annotations, in accordance with some embodiments.

FIG. 2 presents an example map 200 illustrating example clustering of map annotations, in accordance with some embodiments. As illustrated, the map 200 comprises map annotations 205, 210, each of which represents a cluster of map annotations associated with transport service opportunities. In particular, each of map annotations 205, 210 represents a cluster of transport service opportunities that at least includes transport service opportunities having an enhanced payout multiplier of 1.8 through 2.2. In accordance with some embodiments, a map annotation representing enhanced-payout transport service opportunities is selected as the single map annotation of the map annotation 205 based on a rule that indicates that the enhanced-payout transport service opportunities have higher priority for selection over other transport service opportunities that are clustered and represented by the map annotation 205. The map annotation for the map annotation 210 can be selected in a similar manner. As described herein, user selection of one of the map annotations 205, 210 can cause the map 200 to be adjusted to a higher zoom level and the selected map annotation to "split" into the map annotations represented by the selected map annotation. The map 200 comprises a map annotation 215 representing a user (e.g., driver) on the map 200, which can enable the user to determine their geographic location on the map 200 relative to the displayed map annotations 205, 210. The map 200 also comprises a search field 220 that permits a user to enter a search query regarding a geographic location, a place, or the like, which could trigger the adjustment of the map 200.

Figure 3:
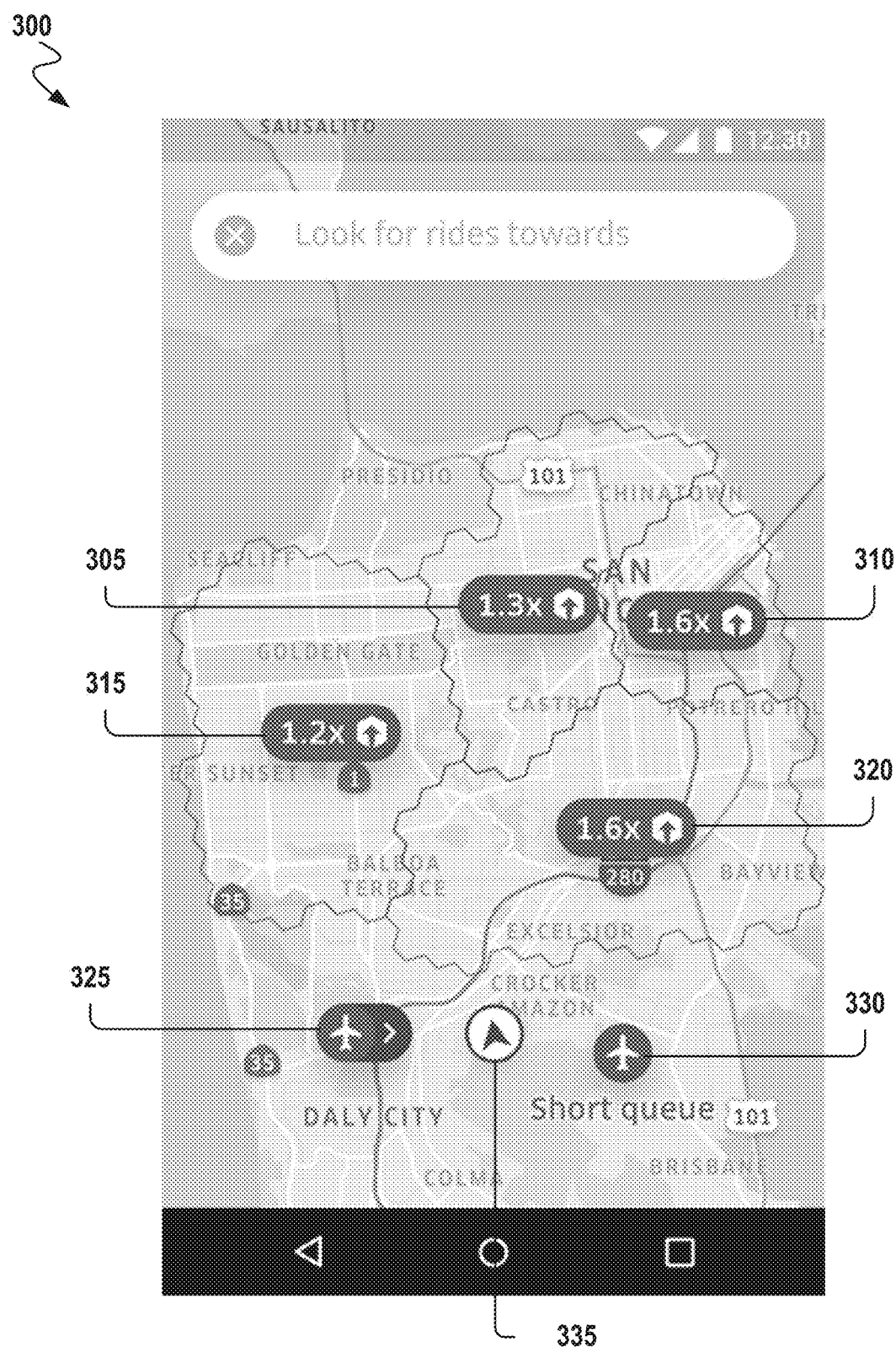

FIG. 3 presents an example map 300 illustrating example clustering of map annotations, in accordance with some embodiments. As illustrated, the map 300 comprises map annotations 305, 310, 315, 320, 325, each of which represents a cluster of map annotations associated with transport service opportunities. In particular, the map annotation 305 represents a cluster of transport service opportunities that at least includes a transport service opportunity having an enhanced payout multiplier of 1.3, the map annotation 310 represents a cluster of transport service opportunities that at least includes a transport service opportunity having an enhanced payout multiplier of 1.6, the map annotation 315 represents a cluster of transport service opportunities that at least includes a transport service opportunity having an enhanced payout multiplier of 1.2, the map annotation 320 represents a cluster of transport service opportunities that at least includes a transport service opportunity having an enhanced payout multiplier of 1.6, and the map annotation 325 represents a cluster of transport service opportunities that at least includes a transport service opportunity relating to an airport (e.g., pick-up or drop-off). As described herein, user selection of one of the map annotations 305, 310, 315, 320, 325 can cause the map 300 to be adjusted to a higher zoom level and the selected map annotation to "split" into the map annotations represented by the selected map annotation. The map 300 comprises a map annotation 330 that represents one or more transport service opportunities relating to an airport (e.g., drop-off or pick-up) that has a short queue, meaning that the volume for airport transport service opportunities is high and the user would not have to wait long for new airport transport service opportunities if they were to wait in the area. The map 300 also comprises a map annotation 335 representing a user (e.g., driver) on the map 300, which can enable the user to determine their geographic location on the map 300 relative to the displayed map annotations 305, 310, 315, 320, 325, 330.

Figure 4:
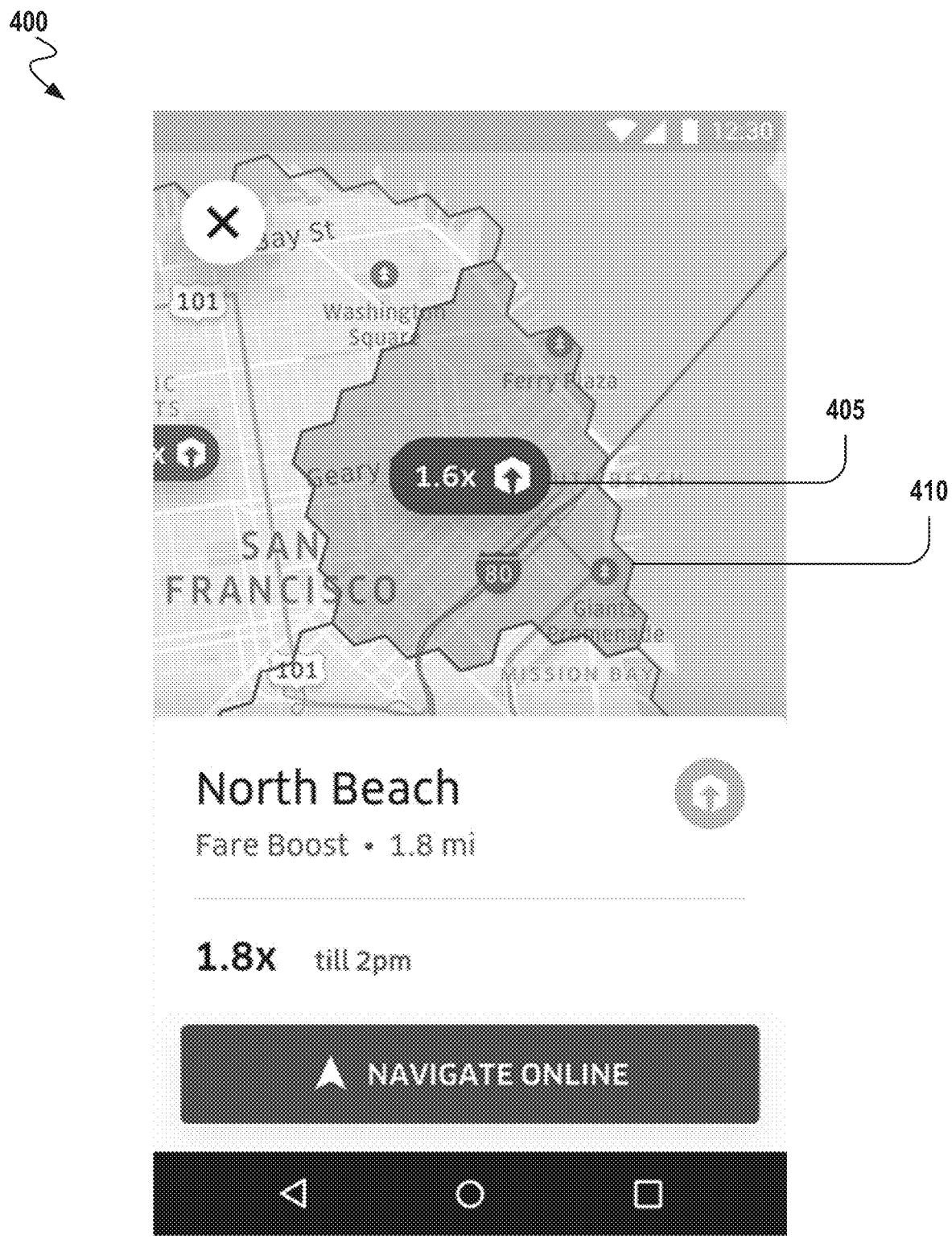

FIG. 4 presents an example map 400 illustrating example clustering of map annotations, in accordance with some embodiments. As illustrated, the map 400 comprises a map annotation 405 that represents a cluster of map annotations associated with transport service opportunities in an indicated geographic region 410.

Figure 5:
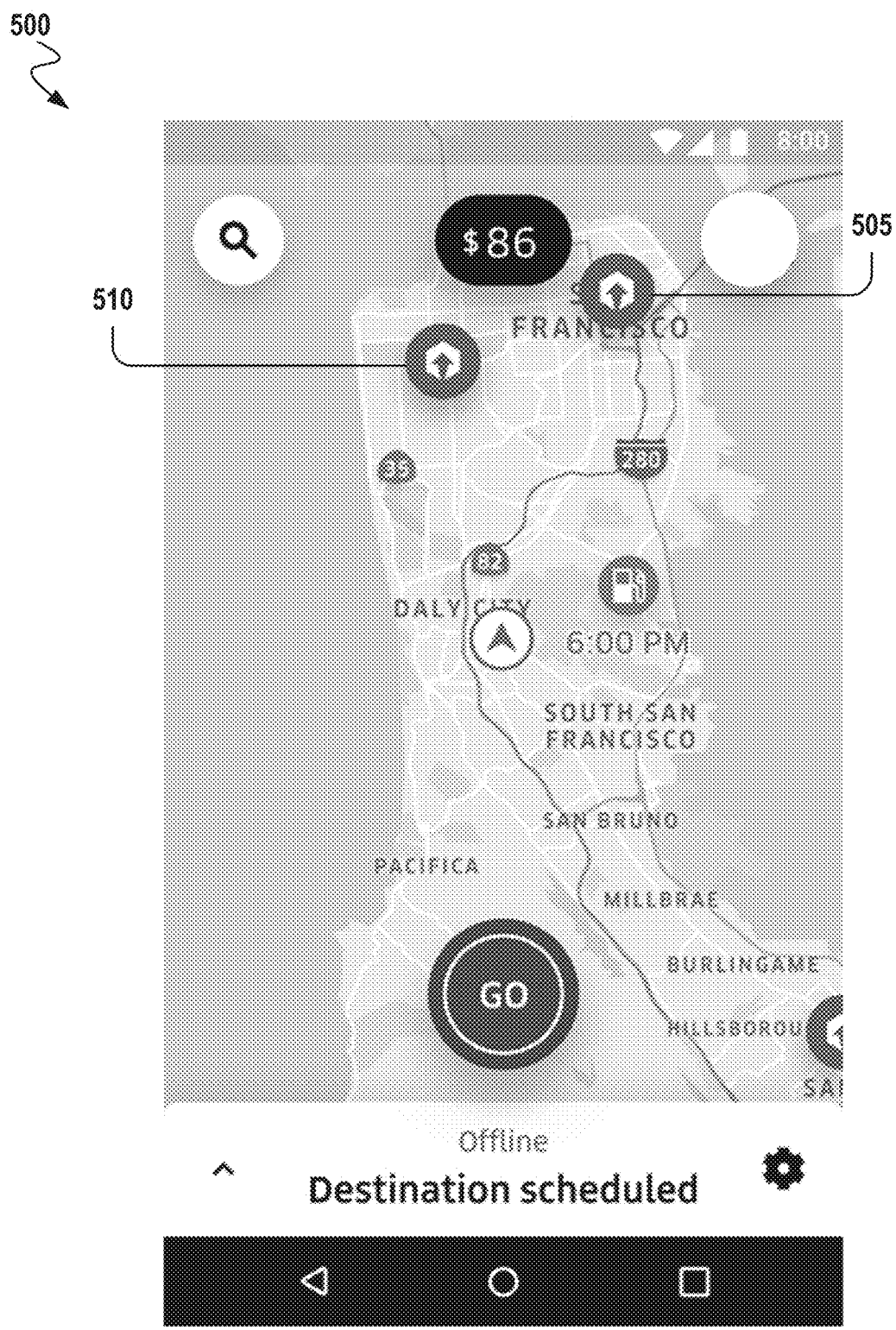

FIG. 5 presents an example map 500 illustrating example clustering of map annotations, in accordance with some embodiments. In particular, the map 500 illustrates clustered map annotations at a higher zoom level than maps 200, 300, and 400 of FIGS. 2, 3, and 4. As illustrated, the map 500 comprises map annotations 505, 510, each of which represents a cluster of map annotations associated with transport service opportunities. In particular, each of map annotations 505, 510 represents a cluster of transport service opportunities that at least includes transport service opportunities having an enhanced payout.

Figure 6:
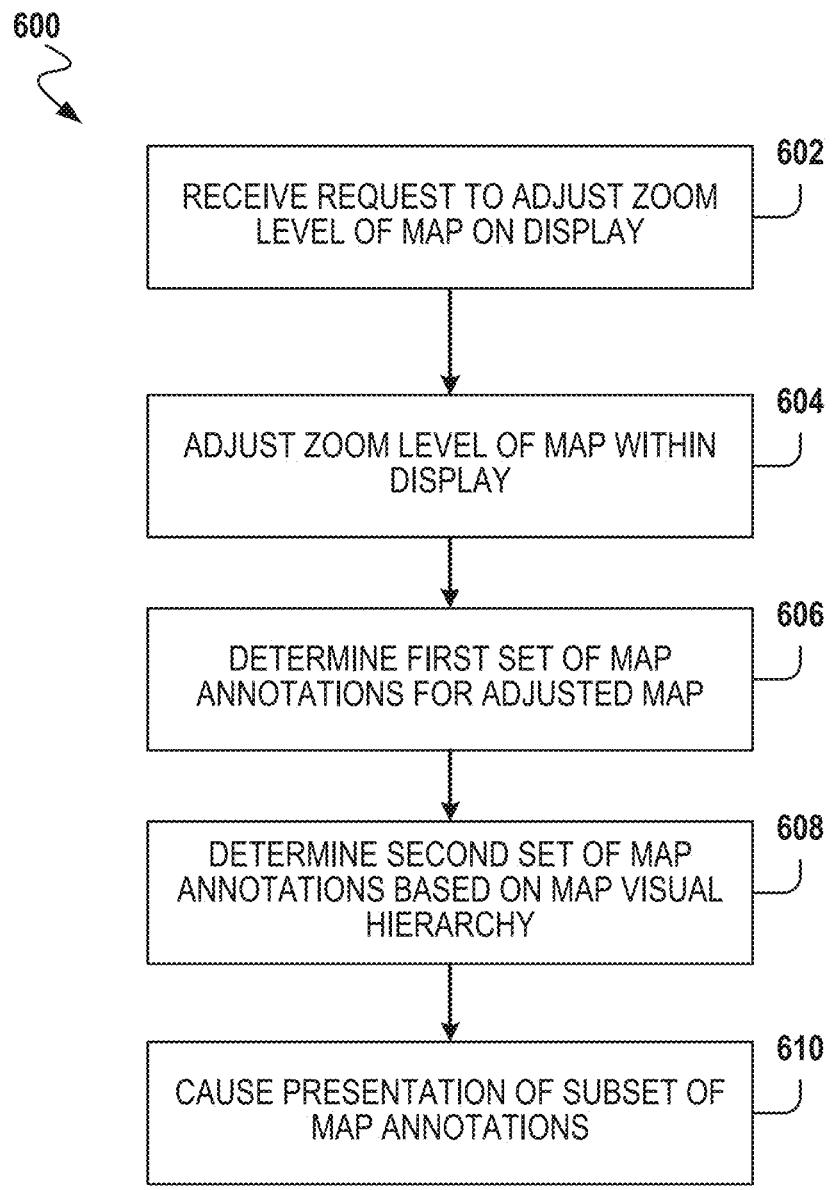
FIG. 6 is a flowchart illustrating an example method for annotating a geographic map, in accordance with some embodiments.

FIG. 6 is a flowchart illustrating an example method for annotating a geographic map, according to some embodiments. It will be understood that example methods described herein are performed by a computing device, such as a server executing instructions of a delivery or transportation service system. Additionally, example methods described herein may be implemented in the form of executable instructions stored on a computer-readable medium or in the form of electronic circuitry. For instance, the operations of a method 600 of FIG. 6 may be represented by executable instructions that, when executed by a processor of a computing node, cause the computing node to perform the method 600. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

Referring now to FIG. 6, the method 600 may be performed by the client device 122 of the provider 120 described above with respect to FIG. 1. An operation of the method 600 may be performed by one or more hardware processors (e.g., central processing unit or graphics processing unit) of the client device 122. For some embodiments, the provider application 124 implements at least some portions of the method 600 via the hierarchy-based map annotation module 126.

The method 600 as illustrated begins with operation 602, where a client device receives (e.g., the client device 122) a user request to adjust a view of a map being displayed on a display of a client device (e.g., 122). As described herein, examples of user requests can include, without limitation, the user panning over the geographic map (thereby causing new portions of the geographic map to be displayed), zooming into the geographic map, zooming out of the geographic map, rotating the geographic map, and changing the perspective of the geographic map (e.g., 2D to 3D view).

Alternatively, a user can submit a search request (e.g., for a geographic location or place) that can cause a new geographic map to be displayed.

The method 600 continues with operation 604 (e.g., the client device 122) adjusting the view of the map within the display to generate an adjusted map on the display. The method 600 can continue to operation 604 in response to the request received at operation 602 or, alternatively, in response to a new geographic map being displayed (e.g., based on a user search request).

The method 600 continues with operation 606 (e.g., the client device 122) determining a first set of map annotations for the adjusted map, where the first set of map annotations comprises at least one map annotation associated with a transport service opportunity. As described herein, determining the first set of map annotations can comprise retrieving (e.g., by a client device from a server) data related to one or more transport service opportunities applicable to at least a portion of the geographic map visible on a display (e.g., coupled to the client device). Depending on the embodiment, the data related to the one or more transport service opportunities can comprise data describing the transport service opportunities or, more specifically, map annotation data for those transport service opportunities.

The method 600 continues with operation 608 (e.g., the client device 122) determining a second set of map annotations from the first set of map annotations (determined at operation 606) based on a map annotation visual hierarchy. As described herein, determining the second set of map annotations based on the map annotation visual hierarchy can comprise filtering the first set of map annotations based on a type of transport service opportunity to determine at least a portion of the second set of map annotations. Determining the second set of map annotations based on the map annotation visual hierarchy can comprise determining that two or more map annotations, in the first set of map annotations, would at least partially overlap (e.g., collide) if displayed on the adjusted map, and clustering together the two or more map annotations into a single map annotation in the second set of map annotations. Determining the second set of map annotations based on the map annotation visual hierarchy can comprise determining that two or more map annotations, in the first set of map annotations, would be too close to each other (e.g., within a certain pixel proximity) if displayed on the adjusted map, and clustering together the two or more map annotations into a single map annotation in the second set of map annotations. Determining the second set of map annotations based on the map annotation visual hierarchy can comprise: determining that two or more map annotations, in the first set of map annotations, would at least partially overlap if displayed on the adjusted map; and selecting, from the two or more map annotations, one or more particular map annotations to be included in the second set of map annotations based on respective map annotation types. Additionally, determining the second set of map annotations based on the map annotation visual hierarchy can comprise filtering the first set of map annotations based on information relating to a transport service provider (e.g., drivers' preference, vehicle characteristic, availability, etc.).

The method 600 continues with operation 610 the client device 122) causing presentation of the second set of map annotations (determined at operation 608) on the adjusted map on the display of the client device (e.g., 122).

Figure 7:
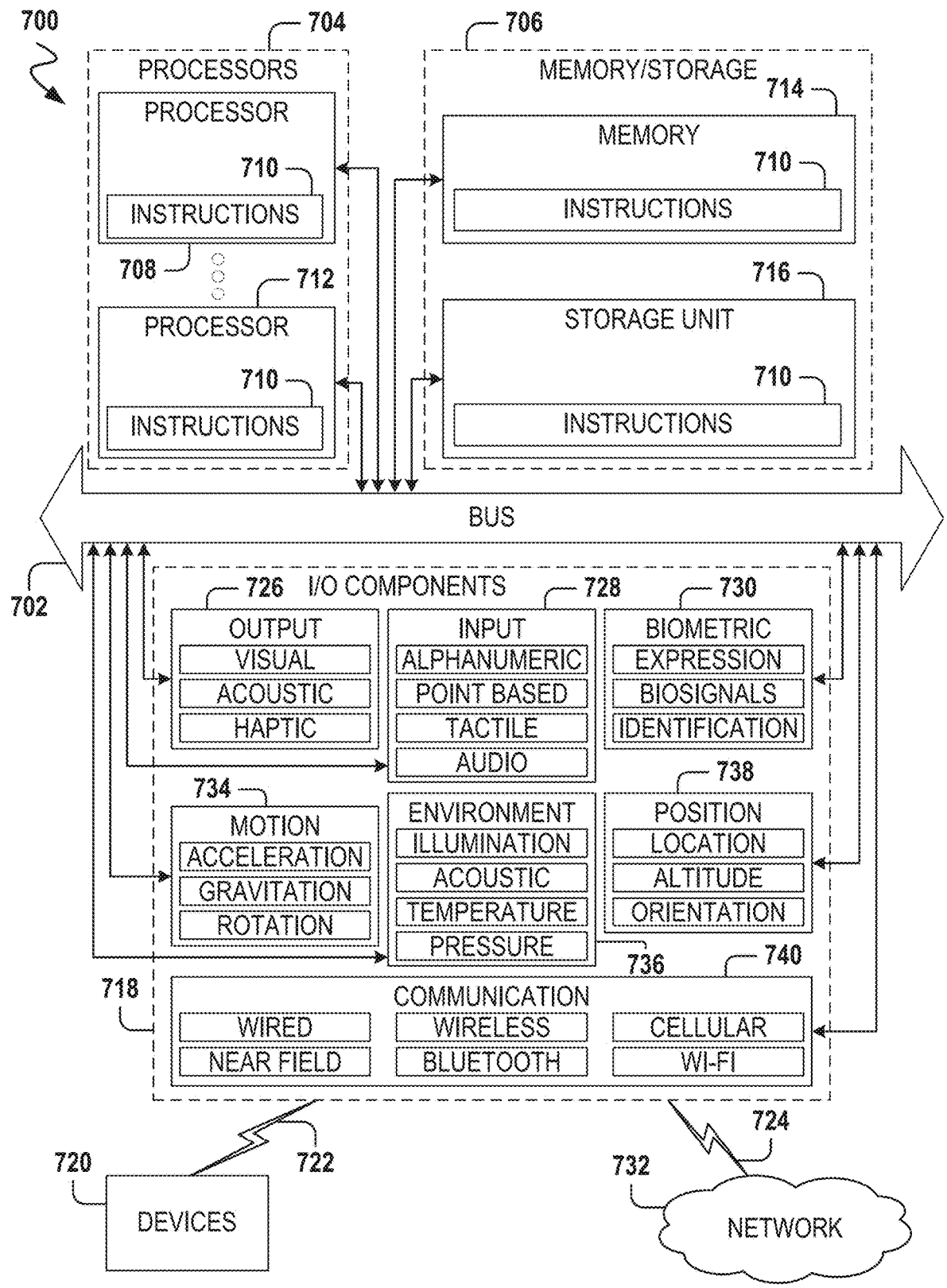
FIG. 7 is a block diagram illustrating components of an example machine used to implement some embodiments.

FIG. 7 is a block diagram illustrating components of the machine 700, according to some embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an apples, an app, or other executable code) for causing the machine 700 to perform any one or more of the methodologies discussed herein may be executed. For example, the instructions 710 may cause the machine 700 to execute the flow diagrams of other figures. Additionally, or alternatively, the instructions 710 may implement the servers associated with the services and components of other figures, and so forth. The instructions 710 transform the general, non-programmed machine 700 into a particular machine 700 programmed to carry out the described and illustrated functions in the manner described.

In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a switch, a controller, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by the machine 700. Further, while only a single machine 700 is illustrated, the term "machine" shall also be taken to include a collection of machines 700 that individually or jointly execute the instructions 710 to perform any one or more of the methodologies discussed herein.

The machine 700 may include processors 704, memory/storage 706, and input/output (I/O) components 718, which may be configured to communicate with each other such as via a bus 702. In an embodiment, the processors 704 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application-Specific Integrated Circuit (ASIC), a Radio-Frequency Integrated Circuit (RFIC), another processor, or any suitable combination thereof) may include, for example, a processor 708 and a processor 712 that may execute the instructions 710. The term "processor" is intended to include multi-core processors that may comprise two or more independent processors (sometimes referred to as "cores") that may execute instructions contemporaneously. Although FIG. 7 shows multiple processors 704, the machine 700 may include a single processor with a single core, a single processor with multiple cores (e.g., a multi-core processor), multiple processors with a single core, multiple processors with multiples cores, or any combination thereof.

The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of the processors 704 are examples of machine-readable media.

As used herein, "machine-readable medium" can mean a device able to store instructions and data temporarily or permanently and may include, but is not limited to, random-access memory (RAM), read-only memory (ROM), buffer memory, flash memory, optical media, magnetic media, cache memory, other types of storage (e.g., Electrically Erasable Programmable Read-Only Memory (EEPROM)), or any suitable combination thereof. The term "machine-readable medium" should be taken to include a single medium or multiple media (e.g., a centralized or distributed database, or associated caches and servers) able to store the instructions 710. The term "machine-readable medium" shall also be taken to include any medium, or combination of multiple media, that is capable of storing instructions (e.g., instructions 710) for execution by a machine (e.g., machine 700), such that the instructions, when executed by one or more processors of the machine (e.g., processors 704), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 718 may include a wide variety of components to receive input, provide output, produce output, transmit information, exchange information, capture measurements, and so on. The specific I/O components 718 that are included in a particular machine will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion, and the grouping is in no way limiting. In various embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location or force of touches or touch gestures, or other tactile input components), audio input components (e.g., a microphone), and the like.

In further embodiments, the I/O components 718 may include biometric components 730, motion components 734, environmental components 736, or position components 738 among a wide array of other components. For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 734 may include acceleration sensor components (e.g., accelerometer), gravitation sensor components, rotation sensor components (e.g., gyroscope), and so forth. The environmental components 736 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 732 or devices 720 via a coupling 724 and a coupling 722, respectively. For example, the communication components 740 may include a network interface component or other suitable device to interface with the network 732. In further examples, the communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a Universal Serial Bus (USB)).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as location via Internet Protocol (IP) geo-location, location via Wi-Fi® signal triangulation, location via detecting an NFC beacon signal that may indicate a particular location, and so forth.

In various embodiments, one or more portions of the network 732 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 732 or a portion of the network 732 may include a wireless or cellular network, and the coupling 724 may be a Code Division Multiple Access (CDMA) connection, a Global System for Mobile communications (GSM) connection, or another type of cellular or wireless coupling. In this example, the coupling 724 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third-Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 710 may be transmitted or received over the network 732 using a transmission medium via a network interface device (e.g., a network interface component included in the communication components 740) and utilizing any one of a number of well-known transfer protocols (e.g., hypertext transfer protocol (HTTP)). Similarly, the instructions 710 may be transmitted or received using a transmission medium via the coupling 722 (e.g., a peer-to-peer coupling) to the devices 720. The term "transmission medium" shall be taken to include any intangible medium that is capable of storing, encoding, or carrying the instructions 710 for execution by the machine 700, and includes digital or analog communications signals or other intangible media to facilitate communication of such software.

Executable Instructions and Machine-Storage Medium

The various memories 706, and/or memory of the processor(s) 704) and/or storage unit 716 may store one or more sets of instructions and data structures (e.g., software) embodying or utilized by any one or more of the methodologies or functions described herein. These instructions, when executed by processor(s) 704, cause various operations to implement the disclosed embodiments.

As used herein, the terms "machine-storage medium," "device-storage medium," "computer-storage medium" (referred to collectively as "machine-storage medium") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 710 may further be transmitted or received over a communications network 740 using a transmission medium via the network interface device and utilizing any one of a number of well-known transfer protocols (e.g., HTTP). Examples of communication networks 740 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 710 for execution by the machine 700, and includes digital or analog communications signals or other intangible medium to facilitate communication of such software.

Some embodiments provide a method comprising: receiving, by a client device, a user request to adjust a view of a map being displayed on a display of the client device; and in response to the user request: adjusting, by the client device, the view of the map within the display to generate an adjusted map on the display; determining, by the client device, a first set of map annotations for the adjusted map, the first set of map annotations comprising at least one map annotation associated with a transport service opportunity; determining, by the client device, a second set of map annotations from the first set of map annotations based on a map annotation visual hierarchy, the determining the second set of map annotations based on the map annotation visual hierarchy comprising filtering the first set of map annotations based on a type of transport service opportunity to determine at least a portion of the second set of map annotations; and causing, by the client device, presentation of the second set of map annotations on the adjusted map on the display. The type of transport service opportunity can comprise a type of tide or tide-share opportunity, or the type of transport service opportunity can comprise a type of delivery opportunity.

The determining the second set of map annotations based on the map annotation visual hierarchy can comprise: clustering together two or more map annotations, in the first set of map annotations, into a single map annotation in the second set of map annotations. The clustering the two or more map annotations, in the first set of map annotations, into the single map annotation in the second set of map annotations can comprise determining that the two or more map annotations would at least partially overlap (e.g., pixels of the annotation collide) if displayed on the adjusted map. The clustering the two or more map annotations, in the first set of map annotations, into the single map annotation in the second set of map annotations can comprise clustering together two or more map annotations based on respective map annotation types. The single map annotation can be selectable by a user using the client device, where user selection of the single map annotation can cause the client device to: adjust the adjusted map to generate a readjusted map; and cause presentation of the two or more map annotations on the readjusted map.

The clustering the two or more map annotations, in the first set of map annotations, into the single map annotation in the second set of map annotations can comprise selecting the single map annotation, from the two or more map annotations, based on a set of map annotation prioritization rules. The set of map annotation prioritization rules can comprise a rule where a map annotation associated with a transport service opportunity having an enhanced payout (e.g., payout to a transport service provider for providing service associated with an transport service opportunity) has higher priority for being selected than another map annotation. The set of map annotation prioritization rules can comprise a rule where a map annotation associated with a first transport service opportunity having an enhanced payout has higher priority for being selected than a map annotation associated with a second transport service opportunity relating to an airport. The set of map annotation prioritization rules can comprise a rule where a map annotation associated with a first transport service opportunity having an enhanced payout has higher priority for being selected than a map annotation associated with a second transport service opportunity relating to an event. The set of map annotation prioritization rules can comprise a rule where a map annotation associated with a first transport service opportunity relating to an airport has higher priority for being selected than a map annotation associated with a second transport service opportunity relating to an event.

The determining the second set of map annotations based on the map annotation visual hierarchy can comprise: determining that two or more map annotations, in the first set of map annotations, would at least partially overlap (e.g., pixels of map annotation collide) if displayed on the adjusted map; and selecting, from the two or more map annotations, one or more particular map annotations to be included in the second set of map annotations based on respective map annotation types. The determining the second set of map annotations based on the map annotation visual hierarchy can comprise: filtering the first set of map annotations based on information relating to a transport service provider (e.g., provider preferences, vehicle characteristics, driver's availability, etc.). Additionally, the determining the second set of map annotations based on the map annotation visual hierarchy can comprise retrieving, by the client device from a server, data related to one or more transport service opportunities applicable to at least a portion of the adjusted map visible on the display.

Some embodiments provide a computer storage medium that comprises instructions that cause the device to perform operations described herein. Additionally, some embodiments provide a system that performs operations described herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

One or more embodiments described herein can be implemented using modules, engines, or components, which may be programmatic in nature. As used herein, a module, engine, or component can comprise a unit of functionality that can be performed in accordance with one or more embodiments described herein. A module, engine, or component might be implemented utilizing any form of hardware, software, or a combination thereof. Accordingly, a module, engine, or component can include a program, a sub-routine, a portion of a software application, or a software component or a hardware component capable of performing one or more stated tasks or functions. For instance, one or more hardware processors, controllers, circuits (e.g., ASICs, PLAs, PALs, CPLDs, FPGAs), logical components, software routines or other mechanisms might be implemented to make up a module, engine, or component. In implementation, the various modules/engines/components described herein might be implemented as discrete elements or the functions and features described can be shared in part, or in total, among one or more elements. Accordingly, various features and functionality described herein may be implemented in any software application and can be implemented in one or more separate or shared modules/engines/components in various combinations and permutations. Even though various features or elements of functionality may be individually described or claimed as separate modules, for some embodiments, these features and functionality can be shared among one or more common software and hardware elements. The description provided herein shall not require or imply that separate hardware or software components are used to implement such features or functionality.

As used herein, the term "or" may be construed in either an inclusive or exclusive sense. The terms "a" or "an" should be read as meaning "at least one", "one or more", or the like. The presence of broadening words and phrases such as "one or more", "at least", "but not limited to", or other like phrases in some instances shall not be read to mean that the narrower case is intended or required in instances where such broadening phrases may be absent. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   receiving, by a client device, a user request to adjust a view of a map being displayed on a display of the client device; and
   in response to receiving the user request:
      adjusting, by the client device, the view of the map within the display to generate an adjusted map on the display;
      determining, by the client device, a first set of map annotations for the adjusted map, the first set of map annotations comprising at least one map annotation associated with a transport service opportunity;
      determining, by the client device, a second set of map annotations from the first set of map annotations, the determining the second set of map annotations including filtering the first set of map annotations based on a type of transport service opportunity to determine at least a portion of the second set of map annotations; and
      causing, by the client device, presentation of the second set of map annotations on the adjusted map on the display including at least one map annotation displayed over a geographic region on the adjusted map, the at least one map annotation comprising a range of enhanced payout multipliers corresponding to the geographic region.

2. The method of claim 1, wherein the filtering the first set of map annotations based on the type of transport service opportunity comprises filtering the first set of map annotations based on a type of ride or ride-share opportunity or based on a type of delivery opportunity.

3. The method of claim 1, wherein the range of enhanced payout multipliers indicates a boost to a standard payout where conditions indicate higher than usual demand for transportation services.

4. The method of claim 1, wherein the determining the second set of map annotations further comprises:
   clustering together two or more map annotations, in the first set of map annotations, into a single map annotation in the second set of map annotations, the single map annotation comprising the range of enhanced payout multipliers.

5. The method of claim 4, wherein the single map annotation is selectable by a user using the client device, user selection of the single map annotation causing the client device to:
   adjust the adjusted map to generate a readjusted map that zooms into a geographic region corresponding to the single map annotation; and
   cause presentation of the two or more map annotations on the readjusted map, each of the two or more map annotations including a corresponding enhanced payout multiplier from the range of enhance payout multipliers.

6. The method of claim 1, wherein the determining the second set of map annotations further comprises:
   clustering together two or more map annotations, in the first set of map annotations, into a single map annotation in the second set of map annotations, the clustering comprising determining that the two or more map annotations would at least partially overlap if displayed on the adjusted map.

7. The method of claim 1, wherein the determining the second set of map annotations further comprises:
   clustering together two or more map annotations, in the first set of map annotations, into a single map annotation in the second set of map annotations, the clustering comprising clustering together the two or more map annotations based on respective map annotation types.

8. The method of claim 1, wherein the determining the second set of map annotations further comprises:
   clustering together two or more map annotations, in the first set of map annotations, into a single map annotation in the second set of map annotations, the clustering comprising selecting the single map annotation, from the two or more map annotations, based on a set of map annotation prioritization rules.

9. The method of claim 8, wherein the set of map annotation prioritization rules comprises a rule where a map annotation associated with a transport service opportunity having an enhanced payout has higher priority for being selected than another map annotation.

10. The method of claim 8, wherein the set of map annotation prioritization rules comprises a rule where a map annotation associated with a first transport service opportunity having an enhanced payout has higher priority for being selected than a map annotation associated with a second transport service opportunity relating to an airport.

11. The method of claim 8, wherein the set of map annotation prioritization rules comprises a rule where a map annotation associated with a first transport service opportunity having an enhanced payout has higher priority for being selected than a map annotation associated with a second transport service opportunity relating to an event.

12. The method of claim 8, wherein the set of map annotation prioritization rules comprises a rule where a map annotation associated with a first transport service opportunity relating to an airport has higher priority for being selected than a map annotation associated with a second transport service opportunity relating to an event.

13. The method of claim 1, wherein the determining the second set of map annotations further comprises:
   determining that two or more map annotations, in the first set of map annotations, would at least partially overlap if displayed on the adjusted map; and
   selecting, from the two or more map annotations, one or more particular map annotations to be included in the second set of map annotations based on respective map annotation types.

14. The method of claim 1, wherein the determining the second set of map annotations further comprises:
   filtering the first set of map annotations based on information relating to a transport service provider, the transport service provider being a driver or courier.

15. The method of claim 1, wherein the determining the first set of map annotations for the adjusted map comprises:
   retrieving, by the client device from a server, data related to one or more transport service opportunities applicable to at least a portion of the adjusted map visible on the display.

16. A non-transitory computer storage medium comprising instructions that, when executed by one or more hardware processors of a device, cause the device to perform operations comprising:
   adjusting a view of a map, displayed within a display coupled to the device, to generate an adjusted map on the display;

determining a first set of map annotations for the adjusted map, the first set of map annotations comprising at least one map annotation associated with a transport service opportunity;

determining a second set of map annotations from the first set of map annotations, the determining the second set of map annotations including filtering the first set of map annotations based on a type of transport service opportunity to determine at least a portion of the second set of map annotations; and causing presentation of the second set of map annotations on the adjusted map on the display including at least one map annotation displayed over a geographic region on the adjusted map, the at least one map annotation comprising a range of enhanced payout multipliers corresponding to the geographic region.

17. The non-transitory computer storage medium of claim 16, wherein the determining the second set of map annotations further comprises:

clustering two or more map annotations, in the first set of map annotations, into a single map annotation in the second set of map annotations, the clustering comprises determining that the two or more map annotations would at least partially overlap if displayed on the adjusted map; or clustering two or more map annotations, in the first set of map annotations, into a single map annotation in the second set of map annotations, the clustering being based on respective map annotation types.

18. The non-transitory computer storage medium of claim 17, wherein the single map annotation is selectable by a user using the device, user selection of the single map annotation causing the device to:

adjust the adjusted map to generate a readjusted map; and cause presentation of the two or more map annotations on the readjusted map.

19. A system comprising:

a memory storing instructions; and one or more hardware processors configured by the instructions to perform operations comprising:

receiving a user request to adjust a view of a map being displayed on a display coupled to the computing device; and in response to receiving the user request:

adjusting the view of the map within the display to generate an adjusted map on the display;

determining a first set of map annotations for the adjusted map, the first set of map annotations comprising at least one map annotation associated with a transport service opportunity;

determining a second set of map annotations from the first set of map annotations, the determining the second set of map annotations including filtering the first set of map annotations based on a type of transport service opportunity to determine at least a portion of the second set of map annotations; and causing presentation of the second set of map annotations on the adjusted map on the display including at least one map annotation displayed over a geographic region on the adjusted map, the at least one map annotation comprising a range of enhanced payout multipliers corresponding to the geographic region.

* * * * *